(No Model.)
A. M. BURRITT.
MACHINE FOR TAPPING STEAM, GAS, OR WATER FITTINGS.
No. 379,761. Patented Mar. 20, 1888.
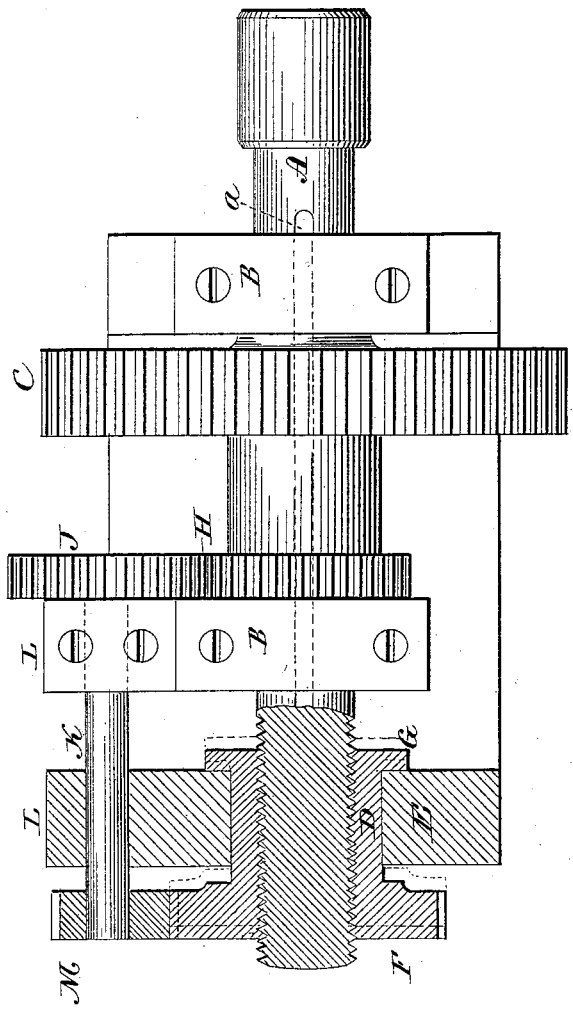

UNITED STATES PATENT OFFICE.

ALBERT M. BURRITT, OF WATERBURY, CONNECTICUT.

MACHINE FOR TAPPING STEAM, GAS, OR WATER FITTINGS.

SPECIFICATION forming part of Letters Patent No. 379,761, dated March 20, 1888.

Application filed October 24, 1887. Serial No. 253,197. (No model.)

*To all whom it may concern:*

Be it known that I, ALBERT M. BURRITT, of Waterbury, in the county of New Haven and State of Connecticut, have invented a new Improvement in Machines for Tapping Steam, Gas, or Water Fittings; and I do hereby declare the following, when taken in connection with accompanying drawing and the letters of reference marked thereon, to be a full, clear, and exact description of the same, and which said drawing constitutes part of this specification, and represents a top or plan view in partial section of so much of a tapping-machine as necessary to illustrate this invention.

This invention relates to an improvement in machines for tapping articles known in the trade as steam, gas, or water fittings. In these articles the pitch of the screw-threads vary according to the size of the article. It is therefore desirable that a single machine shall be adapted to tap the various sizes of articles. Consequently it is necessary that the same machine shall be adapted to give a feed corresponding to the various screw-threads. This feed is now generally produced by means of a leading-screw under some arrangement which imparts to the tap an advance movement corresponding to the thread it is to cut. The leading-screw, being of one pitch, is adapted to the varying pitches for the feed of the tap by differential gearing between the spindle which carries the tap and the leading-screw, so that by change of gearing between the spindle and leading-screw the feed of the leading-screw is made to correspond with the pitch of the thread of varying taps. If the leading-screw be made directly on the spindle or unyieldingly attached to it, with the nut also rigid, a difficulty arises in reversing the spindle to withdraw the tap, owing to "backlash" between the gears. If there be no yielding between the leading-screw and the spindle, directly or indirectly, the action of the feed and the tap must be simultaneous; otherwise the thread which has been cut by the tap would be "stripped." It is impossible to make the simultaneous reversing of the leading-screw and the tap because of the intermediate gears. Various devices have been introduced between the leading-screw and the tap or tap-spindle to overcome this difficulty.

The object of my invention is to accomplish this result in a simple and effective manner.

In illustrating the invention I show only so much of the machine as includes the spindle, the leading-screw feed, and the intermediate gearing.

A represents the tap-spindle, which is arranged to revolve freely in suitable bearings, B B, but so as to be free therein for longitudinal movement.

C represents the driving-gear, or may be a pulley, to which a band is applied. This gear is arranged upon the spindle A between the bearings B B, but so as to allow the spindle to move freely through it, yet so that the spindle shall partake of the revolution of the gear. The connection between the driving-gear and the spindle is produced in the well-known manner by means of a longitudinal groove, $a$, in the spindle and a corresponding key in the hub of the driving-gear.

At the rear end and outside the rear bearing the spindle is screw-threaded to form the leading-screw. Upon this screw-threaded portion a nut, D, correspondingly screw-threaded, is arranged, and is supported in a bearing, E. The outside of the nut is cylindrical and rests in the bearing E, so as to revolve freely therein, but so that it may be permitted a limited amount of longitudinal movement. The nut is formed as a part of a gear, F, or is attached to the gear F, so that the nut forms the hub of the gear, and both revolve together.

Upon the inner end the nut is provided with a collar, G, which is adapted to bear against the inner face of the bearing E, and at its outer end the gear F forms practically a similar collar, which may bear against the outer face of the bearing E, these collars being distant from each other more than the width of the bearing E.

On the spindle is a gear, H, which works into a corresponding gear, J, on a counter-shaft, K, supported in bearings L L, the said counter-shaft carrying at its other end a pinion, M, which works into the gear F, the several gears being of a size so as to permit a differential rotation between the spindle and the screw, and this may be varied by changing the gears M F, substituting others therefor, or introducing intermediate gears in the well-known manner for adjustable gearing in screw-cutting lathes, too well known to require illustration or description.

The operation of these devices is as follows: If the revolution of the nut D and the spindle were the same, then no longitudinal movement of the spindle would be permitted; but under differential gearing the spindle will advance according to the difference in the revolution of the spindle and nut, and this advance is the pitch for the thread required to be cut in the fitting. After the thread has been cut in the fitting, the revolution of the spindle is reversed to withdraw the tap; but upon such reversal of the spindle the backlash in the gearing prevents the instantaneous reversing of the revolution of the nut. That nut consequently remains stationary as to revolution until the backlash is taken up. Now if there were no longitudinal movement permitted to the nut, the result of reversing under such circumstances would be that the spindle, revolving in a backward direction, but without longitudinal movement, would cause the thread in the fitting to "strip;" but as the nut is permitted a limited amount of longitudinal movement it follows that such longitudinal movement will be imparted to the nut during the first part of the reverse movement of the spindle and until the backlash of the gearing is taken up. Thus the stripping is avoided and the mechanism for so doing is of a very simple character.

From the foregoing it will be understood that I am aware of United States Patent No. 280,575; but in that patent the feed is produced by means of a screw-sleeve on the mandrel, and through which the mandrel is adapted to slide to a limited extent, the said sleeve working through a revolving nut which is stationary as to longitudinal movement. In this invention, by giving to the nut a limited amount of longitudinal movement in its bearing, I am enabled to make the feed-screw an integral part of the mandrel. My invention is therefore an improvement upon the said patent, and I do not wish to be understood as claiming as my invention anything shown or described in the said patent, except as in the combination hereinafter recited.

I claim—

In a tapping-machine, the combination of the revolving spindle A, supported in suitable bearings and externally screw-threaded for a portion of its length, a correspondingly-threaded revolving nut, D, upon said screw-threaded portion of the spindle and supported in a bearing concentric with said spindle, the length of the nut being greater than the length of the said bearing and the nut provided with a collar upon its ends, substantially as described, and whereby a limited amount of longitudinal movement is permitted to said nut, a gear on said spindle and revolving therewith, a second gear fixed to said nut through which said nut receives its revolving movement, and gears intermediate between said gear on the spindle and the said gear on the nut, whereby a differential revolution may be imparted from said spindle to said nut.

ALBERT M. BURRITT.

Witnesses:
F. B. FIELD,
J. C. WHEELER.